March 10, 1964    R. F. ANDERSON    3,124,641
ELECTRIC TERMINAL
Filed May 20, 1960
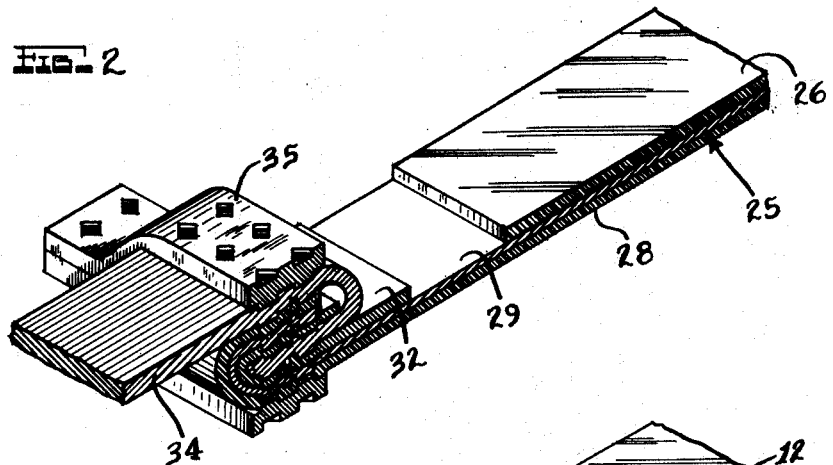
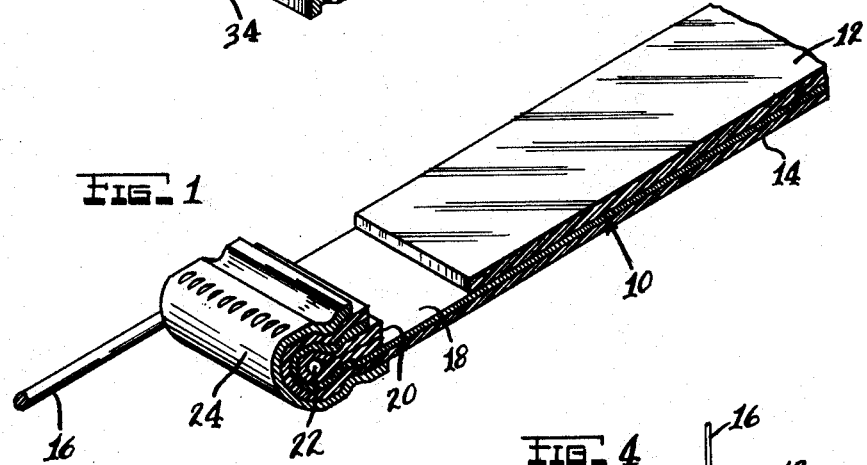
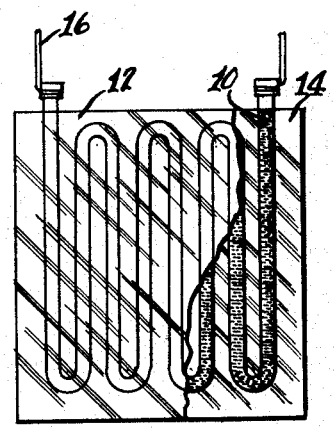
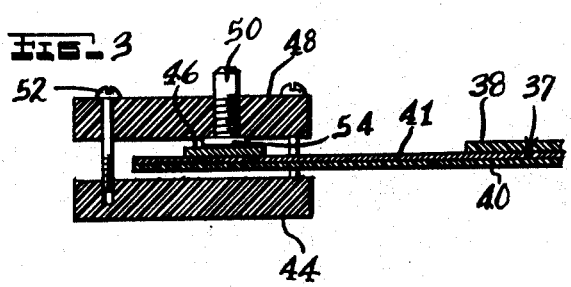
INVENTOR.
RICHARD F. ANDERSON,
BY
Schley Trask & Jenkins
ATTORNEYS.

3,124,641
ELECTRIC TERMINAL
Richard F. Anderson, Columbus, Ind., assignor to Arvin Industries, Inc., Columbus, Ind., a corporation of Indiana
Filed May 20, 1960, Ser. No. 30,541
6 Claims. (Cl. 174—84)

This invention relates to an electric terminal for a metallic foil grid, and constitutes an improvement of the electric terminal described and claimed in copending application Serial No. 819,403, filed June 10, 1959, now Patent No. 2,945,083, issued July 12, 1960.

The electric terminal which is the subject matter of the aforesaid application has worked very satisfactorily in commercial operation, but it has been found that if any moisture comes in contact with the terminal, a galvanic cell is created, and due to the differences in the electromotive potentials between the metallic foil, normally aluminum, and the lead-in conductor, normally copper, the metal of said foil will be deposited onto said conductor. This creates a problem in that the foil normally employed in metallic foil grids has a thickness of only about 0.0003 inch, and thus even though only a minute amount of the metallic foil be deposited on the conductor, the metallic foil will be eaten away throughout its entire thickness to thus destroy the terminal's conductive path.

It is thus the general object of my invention to provide an electric terminal for a metallic foil grid which will overcome this difficulty. More specifically, it is an object of my invention to provide an electric terminal for a foil grid in which the metallic foil will not be sacrificed onto a lead-in conductor, which can be easily and quickly secured to said grid to provide a rigid connection therewith, which will be adapted to be connected to an electrical lead for said grid, and which will provide a stable conductive path between said lead and the grid irrespective of their environmental conditions.

My invention is concerned with the provision of an electric terminal for a metallic foil grid of the type commonly laminated between a pair of sheets of insulating material. In the preferred embodiment of my invention, the insulation is removed from the metallic foil adjacent an end thereof and a thin metallic insert is disposed on the exposed face of the foil in surface-to-surface contact therewith. A relatively rigid strip of conductive metal is then placed on the insert, and the end of the foil and said insert are bent over the metallic strip to thus sandwich the insert between the foil and the strip of conductive metal in surface-to-surface contact therewith. Conveniently, a clip is disposed over the overlapping faces of the foil, metallic strip, and the insert, and is crimped thereon to thus hold them together in intimate contact and provide a rigid conductive joint between the metallic strip, conductive insert, and the foil grid.

In order to prevent the metallic foil from being deposited onto the relatively rigid metallic strip in the event that a galvanic cell is created due to the presence of moisture on or around the terminal, the metallic insert has an electromotive potential at least as great as the electromotive potential of said metallic foil. Thus, should such a cell be established, the metal of the insert will be sacrificed onto the metallic strip to thus leave the metallic foil grid intact. Convenietly, all of the exposed areas of the terminal may be coated with a thin film of a water-resistant material to reduce the possibility of the establishment of such a galvanic cell.

Other objects and features of my invention will become apparent from the more detailed description which follows and from the accompanying drawing, in which:

FIG. 1 is a fragmentary isometric view of my terminal connected to a foil grid;
FIG. 2 is a fragmentary isometric view of a modified form of the terminal shown in FIG. 1;
FIG. 3 is a vertical section showing still another modification of my terminal connected to a foil grid; and
FIG. 4 is a side elevation of a foil heating grid with portions thereof broken away and showing a pair of my electric terminals connected thereto.

As illustrated in the drawing, my invention relates to an electrical connection for a metallic foil grid 10 of the type commonly used in radiant-heating panels. As shown in FIG. 4, such grids generally comprise a continuous length of a relatively low-resistance metal, such as aluminum, formed in narrow elongated strips which define a continuous sinuous conductive path. The foil used in such grids normally has a thickness in the range of from about 0.0003 inch to about 0.001 inch, and because of its extreme thinness, it is normally laminated between a pair of sheets 12 and 14 of flexible insulating material to insulate said grid and protect it from tearing or breaking. One such insulating material in common use is sold by E. I. du Pont de Nemours & Co., Inc., under the trademark "Mylar" (polyethylene terephthalate).

The extreme thinness of the foil grid 10 makes it extremely difficult to solder lead wires 16 to said grid. My invention is thus concerned with the provision of an electric terminal for such foil grids.

In forming the terminal shown in FIG. 1, a portion of one of the sheets 12 or 14 is removed from the grid adjacent an end thereof to expose the end portion 18 of one face of the foil strip forming said grid. An electrically conductive insert 20 in the form of a thin strip of metal is then placed on the exposed end face of the foil in surface-to-surface contact therewith. The insert 20 has a thickness in the range of from about 0.001 inch to about 0.005 inch which is substantially thicker than the foil grid 10. The end of the lead-in wire, conveniently a copper wire, is bent normal to the general length of said wire to provide a leg 22 which is placed on the insert 20, and the end of the foil grid 10 and the insert 20 are then folded over the wire leg 22 into the position illustrated in FIG. 1 in which the outer faces of the insert 20 are in surface-to-surface contact with the inwardly presented faces of the retroverted end of the grid and the opposed inner faces of said insert are disposed in surface-to-surface contact with the wire leg 22. The several components are then rigidly locked together by means of a U-shaped clip 24 disposed over the several components and crimped thereon.

The metal forming the insert 20 has an electromotive potential equal to or higher than the electromotive potential of the metal forming the foil grid 10 and greater than the electromotive potential of the metal forming the lead-in wire 16. That is, the metal of the insert 20 is either the same as the metal forming the grid 10, or is a metal occupying a higher position on the electromotive displacement series than the metal of the foil grid. For example, if the grid 10 is formed from aluminum foil, the insert 20 may be also formed of aluminum, magnesium, or any other metal having a greater electromotive potential than aluminum and higher than the electromotive potential of the lead-in 16. Thus, in the event that moisture should come in contact with the terminal, the metal of the insert 20 will be sacrificed and displaced onto the lead-in wire leg 22 rather than the metal of the foil grid 10.

Conveniently, to reduce the possibility of moisture coming in contact with the terminal to create a galvanic cell resulting in the subsequent sacrifice of the metallic insert 20 onto the lead-in wire leg 22, the exposed areas of the terminal may be protected with a thin film of a water-resistant material, such as an acrylic resin, epoxy resin, liquid vinyls, oil base inks (i.e., resist used in silk screening), or the like.

A modified form of my invention is illustrated in FIG. 2 in which a foil grid 25 is laminated between a pair of insulating sheets 26 and 28, with a portion of one of said sheets 26 or 28 being removed from the foil grid adjacent an end thereof to expose the end portion 29 of one face of said grid. An insert 32 formed from a thin strip of metal having an electromotive potential at least as high as the metal forming the foil grid 25 is disposed on the exposed face of the foil end 29, and the ends of said foil grid and metallic insert are then formed into retroverted bends with the insert thus in surface-to-surface contact with a pair of faces on the end 29 of the foil grid. A metallic strip 34 having a thickness substantially greater than the thickness of the foil forming the grid 25 has one of its ends bent into a retroverted bend opposed to the retroverted bends in the grid and insert 32 whereby the strip 34 is disposed in surface-to-surface contact with a pair of faces on the insert 32. The several components are then rigidly locked together by a metallic clip 35 received over the interlocked retroverted ends of the several components and crimped thereon.

Still another modification of my invention is illustrated in FIG. 3 in which a metallic foil grid 37 is interposed between a pair of sheets 38 and 40 of insulation, with a portion of one of said sheets being removed from the grid adjacent an end thereof to expose the end portion 41 of one face of the foil grid. The end of the grid is placed on a block of insulation 44 with the insulating sheet remaining on the end of the grid being disposed against said insulating block. An insert 46 formed from a thin strip of metal having an electromotive potential at least as high as the metal forming the foil grid is disposed on the exposed end face 41 of the grid in surface-to-surface contact therewith. A second block of insulation 48 having a stud 50 of electrically conductive metal mounted therein is then fastened, as by screws 52, to the insulating block 44. One end of the stud 50 projects outwardly from one face of the insulating block 48 for connection to a lead-in wire, and the opposite end of the stud has an expanded head 54 projecting outwardly from the opposite face of said insulating block so that as the pair of insulating blocks 44 and 48 are drawn together, the opposed faces of the insert 46 will be disposed in surface-to-surface contact with the stud head 54 and the exposed end 41 of the foil grid 37.

Again, in the modifications shown in FIGS. 2 and 3, the inserts employed are substantially thicker than the foil grids, and the terminals are desirably coated with a thin film of a water-resistant material to reduced the possibility of establishing a galvanic reaction between the lead-in members and the metallic foil grids and the terminal inserts.

I claim as my invention:

1. An electric terminal for a foil grid of the type comprising a thin strip of metallic foil interposed between a pair of insulating sheets, one of said pair of sheets being removed from one end of said foil to expose a face thereof, a first strip of metal in surface-to-surface contact with the exposed foil face, a second strip of metal of greater rigidity than said foil and said first strip of metal in surface-to-surface contact with said first strip of metal and projecting outwardly therefrom, and means interlockingly engaging the interleaved strips and foil for retaining said first strip of metal in surface-to-surface contact with said second strip of metal and said foil, the metal of said first strip of metal having an electromotive potential at least as high as the electromotive potential of said metallic foil and the metal of said second strip having an electromotive potential lower than the electromotive potential of said foil.

2. An electric terminal as set forth in claim 1 in which said first strip of metal has a thickness substantially greater than the thickness of said metallic foil.

3. An electric terminal as set forth in claim 1 in which said end of the foil grid has a retroverted bend whereby said exposed foil face will form a pair of opposed inwardly presented foil faces, said first strip of metal has a generally U-shaped configuration and is interposed between said pair of foil faces in surface-to-surface contact therewith, and said second strip of metal comprises an L-shaped length of wire one leg of which is disposed in surface-to-surface contact with the pair of opposed faces on said U-shaped first strip of metal.

4. An electric terminal as set forth in claim 3 in which said means comprises a metal clip crimped on the retroverted end of said foil grid.

5. An electric terminal as set forth in claim 1 in which said end of the foil grid has a retroverted bend, said first strip of metal has a U-shaped configuration in surface-to-surface contact with a pair of faces on said retroverted end of the foil grid, and said second strip of metal has a retroverted end opposed to the retroverted end of said foil grid and interlockingly received in surface-to-surface contact with a pair of faces on said first strip of metal.

6. An electric terminal as set forth in claim 5 in which said means comprises a metal clip crimped over the retroverted ends of said foil grid and said second strip of metal.

References Cited in the file of this patent

UNITED STATES PATENTS

| 2,868,863 | Cook | Jan. 13, 1959 |
| 2,895,002 | Dupre et al. | July 14, 1959 |
| 2,897,254 | Dickinson | July 28, 1959 |
| 2,945,083 | Ganske et al. | July 12, 1960 |

FOREIGN PATENTS

| 578,487 | Great Britain | July 1, 1946 |

OTHER REFERENCES

Burndy Electrical Connectors, Catalog 50, second edition, Burndy Engineering Co. Inc., New York 54, N.Y., page 8 relied on.